(12) United States Patent
Yamamoto et al.

(10) Patent No.: US 12,716,196 B2
(45) Date of Patent: Aug. 25, 2026

(54) ELECTRIC WORK VEHICLE

(71) Applicant: Kubota Corporation, Osaka (JP)

(72) Inventors: Takumi Yamamoto, Sakai (JP); Masahiro Yamada, Sakai (JP); Hirokazu Ito, Sakai (JP)

(73) Assignee: Kubota Corporation, Osaka (JP)

( * ) Notice: Subject to any disclaimer, the term of this patent is extended or adjusted under 35 U.S.C. 154(b) by 389 days.

(21) Appl. No.: 18/517,765

(22) Filed: Nov. 22, 2023

(65) Prior Publication Data

US 2024/0218631 A1 Jul. 4, 2024

(30) Foreign Application Priority Data

Jan. 4, 2023 (JP) ................................ 2023-000164

(51) Int. Cl.
*E02F 9/08* (2006.01)
*B60L 53/80* (2019.01)
*E02F 3/36* (2006.01)
*E02F 9/20* (2006.01)

(52) U.S. Cl.
CPC .......... *E02F 9/0841* (2013.01); *E02F 3/3659* (2013.01); *B60L 53/80* (2019.02); *E02F 9/2091* (2013.01)

(58) Field of Classification Search
CPC ............. B60K 1/04; B60K 2001/0411; B60K 2001/0416; B60K 2001/0444; B60K 2001/0455; B60K 2001/0477; B60K 2001/0488; B60L 53/80; B60Y 2200/223; E02F 3/3659; E02F 9/0841; E02F 9/2091
USPC ......................................................... 180/235
See application file for complete search history.

(56) References Cited

U.S. PATENT DOCUMENTS

| | | | | |
|---|---|---|---|---|
| 4,397,365 | A * | 8/1983 | Harbe | B60K 1/04 414/349 |
| 5,163,537 | A | 11/1992 | Radev | |
| 2014/0003895 | A1* | 1/2014 | Moller | B60L 53/80 414/462 |
| 2019/0014718 | A1* | 1/2019 | Uemura | B60K 1/04 |
| 2019/0263269 | A1 | 8/2019 | Huff et al. | |
| 2019/0381900 | A1 | 12/2019 | Ito et al. | |
| 2020/0384869 | A1 | 12/2020 | Hickey | |

FOREIGN PATENT DOCUMENTS

| | | | |
|---|---|---|---|
| DE | 3121698 | A1 | 4/1982 |
| JP | 2019217900 | A | 12/2019 |
| JP | 2021514897 | A | 6/2021 |
| JP | 2022535288 | A | 8/2022 |

* cited by examiner

*Primary Examiner* — Valentin Neacsu
*Assistant Examiner* — Felicia L. Brittman-Alabi
(74) *Attorney, Agent, or Firm* — The Webb Law Firm

(57) ABSTRACT

An electric work vehicle includes a body 3 configured to travel; a first battery 20 accommodated in the body 3; a three-point link mechanism T connected to a rear section of the body 3 in such a manner as to be swingable up and down; a drive device configured to drive the three-point link mechanism T to swing; and a second battery 60 detachably attached to the three-point link mechanism T. The second battery 60 is switchable, by swinging of the three-point link mechanism T, between a lowered state, in which the second battery 60 is in contact with a ground surface, and a raised state, in which the battery 60 is raised above the ground surface.

6 Claims, 6 Drawing Sheets

B
R
L
F
65
65
60
61
62
63a(63)
63b(63)
63a(63)
50
50
50
P
P
P
50a
50a
50b
T
16
16
18
18
15
9
9a
9a
17
17
9b
2
2
M
5
6
7
8
4
20
1
1
10

17(T)
36
35
PTO TRANSMISSION
REAR WHEEL DIFFERENTIAL DEVICE
31
37
39
CONTROL VALVE
13
(11)
40
PUMP MOTOR
38
30
SUB-TRANSMISSION
FRONT WHEEL TRANSMISSION
32
60
AUXILIARY BATTERY (BATTERY UNIT)
55
SWITCHING OPERATION SECTION
28
CONTINUOUSLY-VARIABLE TRANSMISSION
12
(11)
29
33
MAIN BATTERY
SWITCHING MECHANISM
INVERTER
MOTOR
FRONT WHEEL DIFFERENTIAL DEVICE
25
54
24
26
34

U
F
B
D
9
5
6
4
20
9a
7
52
52a
52b
P(50b)
63b(63)
53
60
61
50
15(T)
18(T)
17(T)
40
62
63a(63)
P(50a)
26
29
8
10
37
50
33
12(11)
36
16(T)
64
65
3
2
1
34
14
M
13(11)

B
R
L
F
65
60
60a
61
52d
63b(63)
63a(63)
62
52c
50
P
50a
50b
T
52
16
18
15
9
17
9a
9b
2
7
M
5
6
8
4
20
1
10

9
9a
52
52c
52d
P(50b)
63b(63)
50
15(T)
63a(63)
P(50a)
64
60
60a
61
62
65
53
18(T)
16(T)
36
2
7
17(T)
37
13(11)
5
40
12(11)
6
8
29
M
26
33
20
4
14
34
1
10
3
U
D
B
F

ELECTRIC WORK VEHICLE

CROSS-REFERENCE TO RELATED APPLICATION

This application claims priority to Japanese Patent Application No. 2023-000164 filed Jan. 4, 2023, the disclosure of which is hereby incorporated by reference in its entirety.

BACKGROUND OF THE INVENTION

1. Field of the Invention

The present invention relates to an electric work vehicle that includes a three-point link mechanism and is driven by a motor supplied with power by a battery.

2. Description of Related Art

In a conventional electric work vehicle, when an attempt is made to increase the running time to realize long-term work travel using a working device such as a mower unit, for example, as described in Patent Document 1 (Japanese Patent Application Publication No. 2019-217900), it has been necessary to include a supplementary battery separate from a main battery.

However, in a conventional electric work vehicle, when the amount of electricity stored in both the main battery and the supplementary battery runs out, it is no longer possible to continue work travel. Also, for example, when attempting to replace the supplementary battery with another charged battery, it is necessary to lift the heavy battery to a high position, resulting in a heavy workload when replacing the battery.

SUMMARY OF THE INVENTION

In view of the above-mentioned problems, the present invention provides an electric work vehicle according to which it is possible to realize long-term work travel and reduce the workload when replacing the battery.

The electric work vehicle of the present invention includes: a body configured to travel; a first battery accommodated in the body; a three-point link mechanism connected to a rear section of the body in such a manner as to be swingable up and down; a drive device configured to drive the three-point link mechanism to swing; and a second battery detachably attached to the three-point link mechanism, in which the second battery is switchable, by swinging of the three-point link mechanism, between a lowered state, in which the second battery is in contact with a ground surface, and a raised state, in which the second battery is raised above the ground surface.

According to this invention, since the second battery is included in addition to the first battery as a battery that supplies power to drive wheels, a working device, or the like of the work vehicle, it is possible to realize more long-term work travel compared to the case where only the first battery is included. Also, since the second battery is detachably included in the three-point link mechanism, the second battery can be replaced with another charged battery, whereby it is possible to realize even more long-term work travel, it is possible to raise the second battery above the ground surface by driving the three-point link mechanism to swing, and it is possible to reduce the workload accompanying battery replacement since the work of lifting the battery to a high position is not needed.

In the present invention, it is preferable to further include a support mechanism by which the second battery is connected to the body and supported on the body while the second battery is in the raised state.

According to this configuration, since the second battery is supported by the support mechanism, it is possible to more suitably prevent the second battery from falling or the like while the second battery is in the raised state.

In the present invention, it is preferable that the body has a rearward portion that includes a protection frame having left and right vertical frame sections and a horizontal frame section that connects the upper ends of the left and right vertical frame sections, and the support mechanism includes two connecting members that connect the left and right vertical frame sections and left and right side walls of the second battery, respectively.

According to this configuration, since the second battery is directly connected to the strong protection frame by the connecting member, it is possible to more firmly prevent the second battery from falling or the like.

In the present invention, it is preferable to further include a switching mechanism configured to automatically or manually switch between power supply from the first battery and power supply from the second battery.

According to this configuration, since the switching mechanism for switching between the first battery and the second battery is included, it is possible to switch to the second battery manually or automatically in response to, for example, the amount of stored electricity in the first battery decreasing. Accordingly, by switching from the first battery to the second battery in response to the supply of power to the drive wheels, the working device, or the like of the work vehicle by the first battery being insufficient, power can be supplied from the second battery and a longer running time of the electric work vehicle can be ensured.

In the present invention, it is preferable that the switching mechanism includes a switching operation section configured to manually switch between power supply from the first battery and power supply from the second battery.

According to this configuration, the operator can switch between power being supplied from the first battery and power being supplied from the second battery, and the degree of freedom in selecting the battery to be used can be increased.

In the present invention, it is preferable that in response to a remaining amount of one battery, out of the first battery and the second battery, that is supplying power being less than a certain value, the switching mechanism automatically switches to power supply from another battery out of the first battery and the second battery.

According to this configuration, in response to the remaining power of the battery that is supplying power falling below a certain value, the battery is automatically switched, and therefore there is no need for the operator to switch the battery during work travel, and it is possible to reduce the operational load of the operator.

DESCRIPTION OF THE INVENTION

Figure 1:
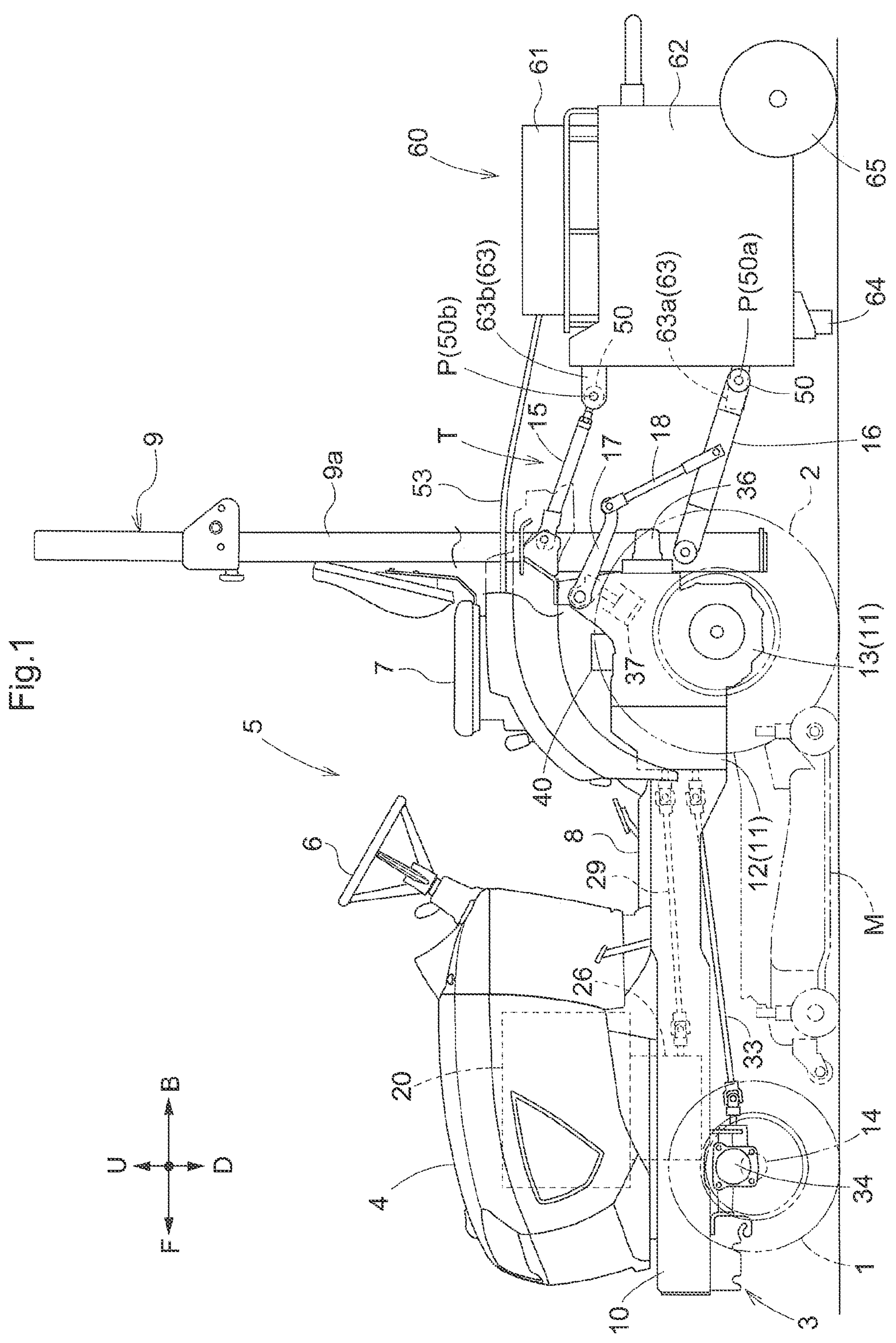
FIG. 1 is a side view of an electric tractor (lowered state).

Embodiments for carrying out the present invention will be described with reference to the drawings. In the following description, unless otherwise specified, the direction of arrow F in the drawings is "frontward", the direction of arrow B is "rearward", the direction of arrow L is "leftward", and the direction of arrow R is "rightward". In addition, the direction of arrow U in the drawings is "upward" and the direction of arrow D is "downward".

Overall Configuration of Tractor

Figure 2:
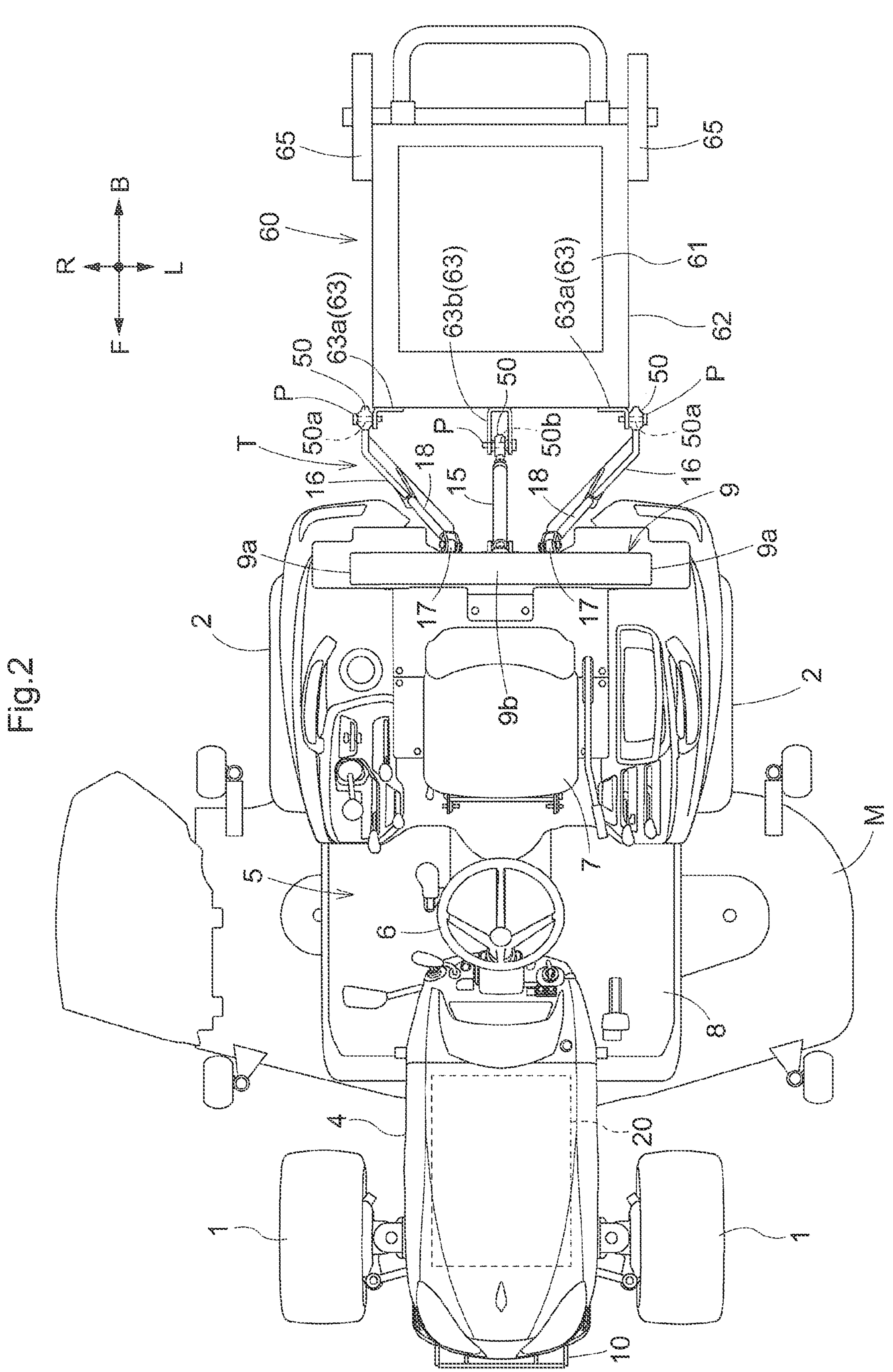
FIG. 2 is a plan view of the electric tractor.

As shown in FIGS. 1 and 2, a body 3 is supported by right and left front wheels 1 (corresponding to the "travel device" of the present invention) and right and left rear wheels 2 (corresponding to the "travel device" of the present invention). The body 3 has a front section provided with a hood 4, and rear section provided with a driving section 5. The driving section 5 is provided with a steering wheel 6 for steering the front wheels 1, a driver's seat 7, and a floor 8.

The body 3 includes a ROPS frame 9 for rollover protection (corresponding to the "protection frame" of the present invention) that extends upward in such a manner as to surround the upper rear side of the driver's seat 7 on the rearward portion of the body 3. The ROPS frame 9 has a pair of left and right vertical frame sections 9*a* extending along the vertical direction, and a horizontal frame section 9*b* that connects the upper ends of the left and right vertical frame sections 9*a* and extends along a horizontal direction.

The body 3 includes right and left body frames 10, a transmission case 11, and the like. The transmission case 11 is formed by connecting a front case 12 and a rear case 13 to each other. The right and left body frames 10 are connected to the transmission case 11 and are arranged below the driving section 5 along a front-rear direction. The transmission case 11 is provided below the driver's seat 7 of the driving section 5.

A front axle case 14 is supported by the front section of the body frame 10, and the right and left front wheels 1 are supported by the front axle case 14. The right and left rear wheels 2 are supported by the transmission case 11 (rear case 13).

In this embodiment, a mower unit M, which is a working device and is driven by electric power, is provided below the floor 8.

[Configuration of Three-Point Link Mechanism]

As shown in FIGS. 1 and 2, a three-point link mechanism T is connected to the rear section of the body 3. The three-point link mechanism T includes a single top link 15 and left and right lower links 16.

The top link 15 and the right and left lower links 16 are provided at the rear section of the transmission case 11 (rear case 13) in such a manner as to be swingable up and down, and a working device (not shown) such as a rotary tilling device can be connected to the top link 15 and the lower links 16. The lower links 16 are swingably connected to the rear section of the body frame 10.

The rear section of the transmission case 11 (rear case 13) is provided with right and left lift arms 17, and linking rods 18 are connected between the lift arms 17 and the lower links 16. By swinging the lift arms 17 up and down, the top link 15 and the lower links 16 are moved up and down.

Also, a main battery 20 (corresponding to the "first battery" of the present invention) is provided inside the hood 4. The main battery 20 is covered by the hood 4 and accommodated in the body 3. A travel motor 26 (corresponding to the "first electric motor" of the present invention) is provided below the main battery 20.

[Configuration of Transmission Case]

Figure 3:
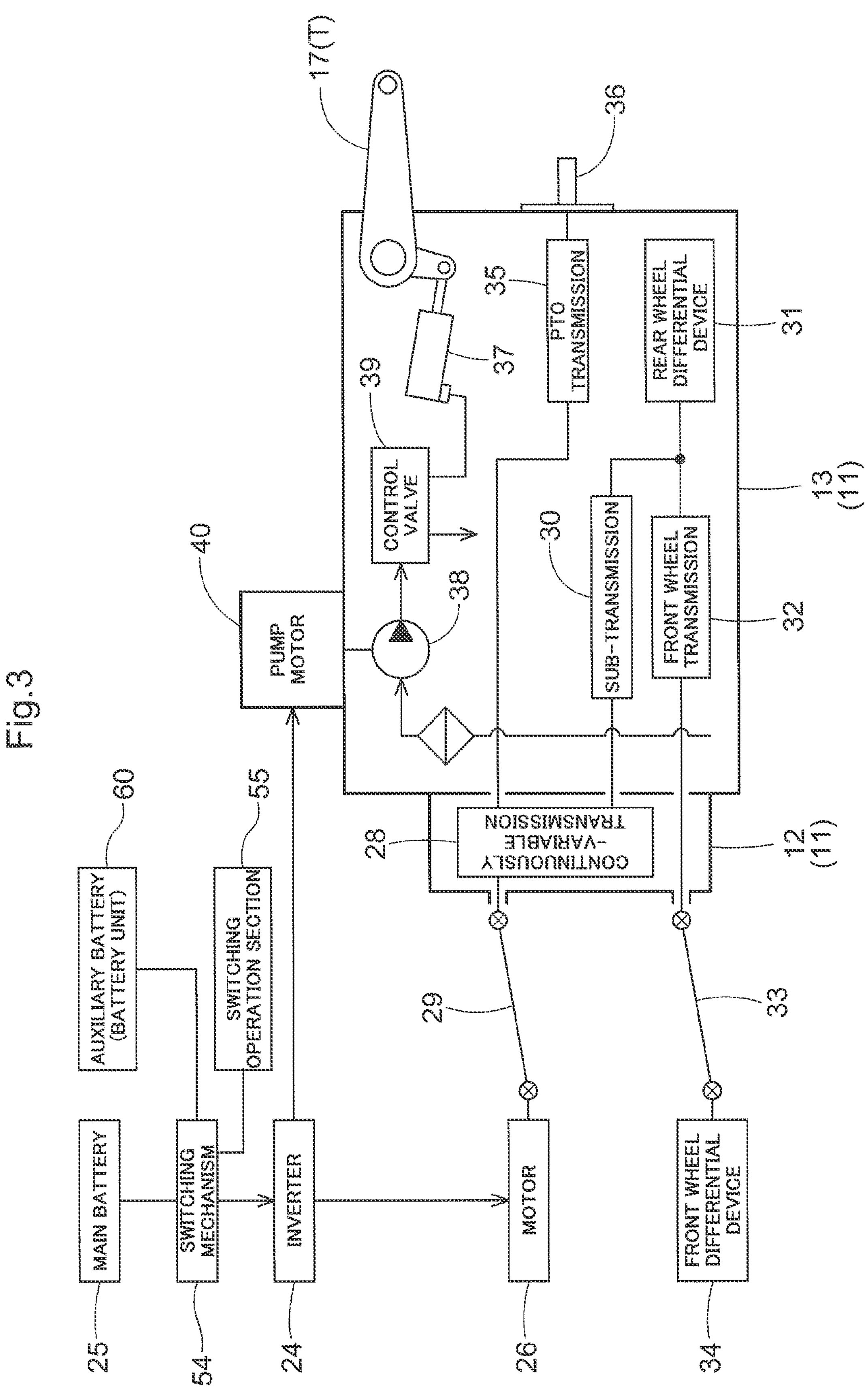
FIG. 3 is a block diagram showing an electrical system of a travel device and a mower.

As shown in FIG. 3, a hydrostatic continuously-variable transmission 28 is accommodated inside the front case 12 of the transmission case 11, and the motive power of the travel motor 26 is transmitted to the continuously variable transmission 28 via a transmission shaft 29. The continuously variable transmission 28 is capable of steplessly changing a speed to a forward side and a reverse side, and is operated by a speed change pedal (not shown) provided on the floor 8 of the driving section 5.

A sub-transmission 30, a rear wheel differential device 31, and a front wheel transmission 32 are accommodated inside the rear case 13 of the transmission case 11. The motive power shifted by the continuously variable transmission 28 is transmitted to the sub-transmission 30, and is transmitted from the sub-transmission 30 to the rear wheels 2 via the rear wheel differential device 31.

The motive power branched from between the sub-transmission 30 and the rear wheel differential device 31 is transmitted to the front wheel transmission 32, is transmitted from the front wheel transmission 32 to the front wheel differential device 34 accommodated inside of the front axle case 14 via a transmission shaft 33, and is transmitted from the front wheel differential device 34 to the front wheels 1.

A PTO transmission 35 is accommodated inside of the rear case 13 of the transmission case 11, and a PTO shaft 36 is provided at the rear section of the rear case 13 of the transmission case 11. When the working device is connected to the top link 15 and the lower links 16, a transmission shaft (not shown) is connected between the PTO shaft 36 and the working device.

When the motive power of the travel motor 26 is transmitted to the continuously variable transmission 28 via the transmission shaft 29, the motive power of the transmission shaft 29 (motive power that does not undergo a speed change by the continuously-variable transmission 28) is transmitted to the PTO transmission 35, and the motive power changed by the PTO transmission 35 is transmitted to the PTO shaft 36, and is transmitted from the PTO shaft 36 to the working device.

A single-acting hydraulic cylinder 37 is provided at the upper part of the rear section of the transmission case 11 (rear case 13), and the lift arm 17 is raised and lowered by the hydraulic cylinder 37.

A hydraulic pump 38 and a control valve 39 are provided inside of the rear section of the transmission case 11 (rear case 13). Lubricating oil stored in the transmission case 11 (rear case 13) is supplied as hydraulic oil to the hydraulic pump 38, and is supplied from the hydraulic pump 38 to the control valve 39.

A pump motor 40 is provided at the upper part of the rear section of the transmission case 11 (rear case 13), and the hydraulic pump 38 is driven by the pump motor 40. The inverter 24 converts the DC power of the main battery 20 into AC power, which is supplied to the pump motor 40, and thus the pump motor 40 operates.

The hydraulic oil is supplied and discharged to and from the hydraulic cylinder 37 by the control valve 39, and thus the lift arms 17 are raised and lowered by the hydraulic cylinder 37, and the hydraulic oil discharged from the hydraulic cylinder 37 is returned from the control valve 39 to the transmission case 11 (rear case 13).

[Attachment of Battery Unit]

Figure 4:
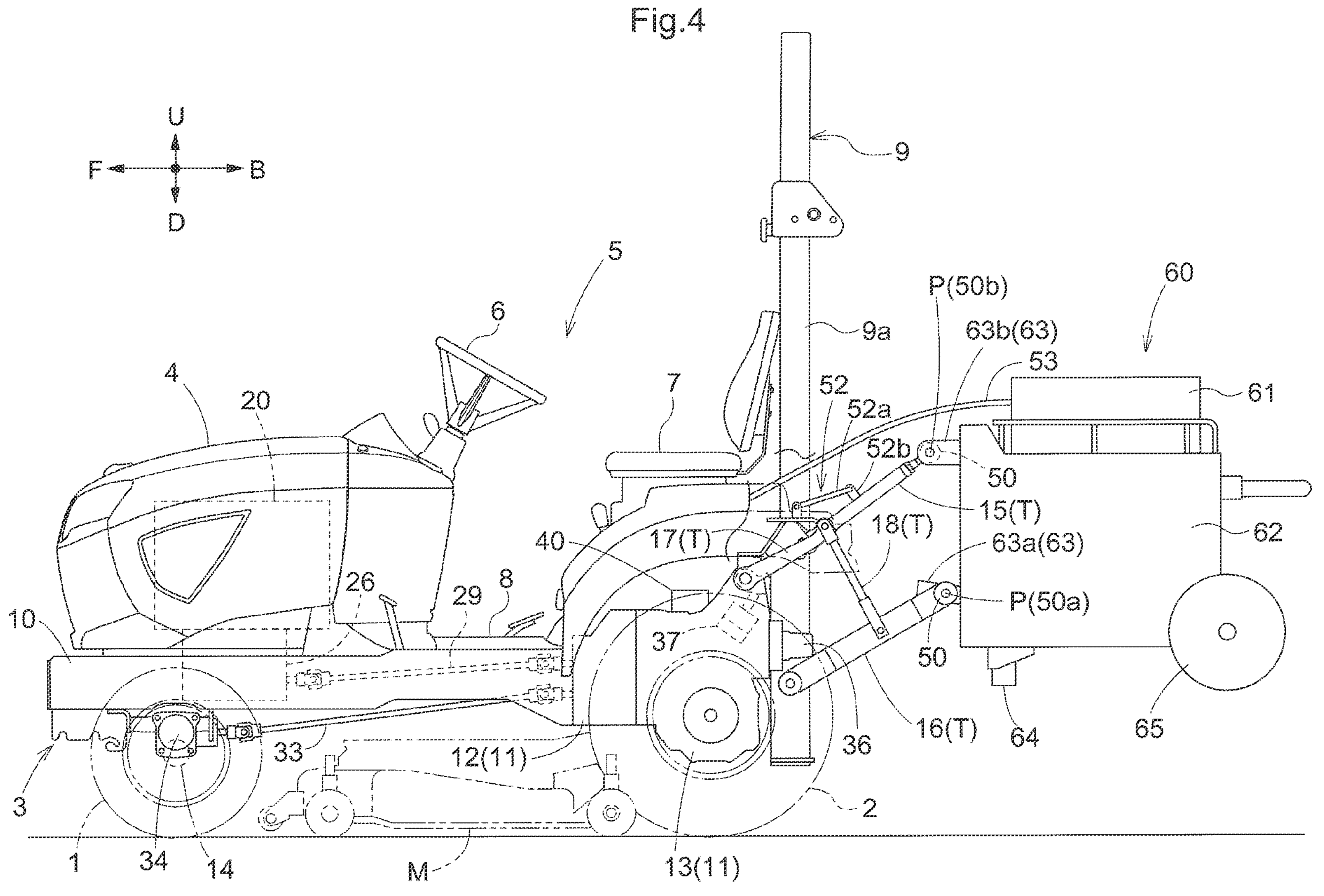
FIG. 4 is a side view showing the electric tractor in a raised state.

As shown in FIGS. 1, 2, and 4, the three-point link mechanism T is configured such that a battery unit 60 (corresponding to the "second battery" of the present invention), which is an auxiliary battery, can be attached thereto.

The main battery 20 and the battery unit 60 supply power to the travel motor 26, the pump motor 40, the mower unit M, and the like.

The top link 15 and the left and right lower links 16 include attached sections 50 to which the battery unit 60 can be attached. The attached section 50 is provided at ends of the top link 15 and the left and right lower links 16 opposite to the side connected to the body 3. The ends of the left and right links 16 are provided with holes 50*a* that can hold the battery unit 60 as attached sections 50, and the end of the top link 15 is provided with a hole 50*b* that can hold a battery unit 60 as an attached section 50. Note that the attached sections 50 may also utilize a configuration that is already provided in the three-point link mechanism T to support a work machine or the like.

The battery unit 60 includes a battery body 61, a carrier 62 that holds the battery body 61, and an attachment section 63 that is provided on the carrier 62 and detachably attaches the battery unit 60 to the three-point link mechanism T.

The carrier 62 includes right and left shoes 64 facing downward at the front lower part of the battery unit 60, and includes large-diameter caster wheels 65 as right and left caster wheels at the right and left ends of the rear lower part of the battery unit 60, respectively. The battery unit 60 is transportable by the large-diameter caster wheels 65 without requiring any other loading platform or the like.

The attachment section 63 includes: lateral attachment sections 63*a* that are provided at respective right-left areas in a lower portion of a front wall of the battery unit 60 and protrude frontward; and a frontward attachment section 63*b* that is provided at an upper portion of the front wall of the battery unit 60.

When attaching the battery unit 60 to the three-point link mechanism T, pins P are inserted through holes provided in the lateral attachment sections 63*a* and the holes 50*a* at the ends of the lower links 16, and then a pin P is further inserted through a hole provided in the frontward attachment section 63*b* and the hole 50*b* at the end of the top link 15, whereby the battery unit 60 is held by the three-point link mechanism T. Note that the pin P may also be locked with a snap pin to prevent it from coming off.

The lift arm 17 is able to swing up and down based on the drive of the pump motor 40, which is a drive device. Then, as the lift arm 17 swings up and down, the lower links 16 swing up and down. The top link 15 connected to the battery unit 60 also swings up and down in a linked manner with the up and down swinging of the lower links 16. The battery unit 60 is connected to each of the top link 15 and the lower links 16 in such a manner as to be swingable relative thereto, and the battery unit 60 moves up and down in in a linked manner with the up and down swinging of the top link 15 and the lower link 16, respectively. With these configurations, the three-point link mechanism T is swingable up and down.

In response to the operator operating a height setting lever (not shown), the pump motor 40 is driven to swing the lift arm 17, and the battery unit 60 moves up and down. In this way, due to the three-point link mechanism T being driven to swing, it is possible to switch between a lowered state, in which the battery unit 60 is in contact with the ground surface as shown in FIG. 1, and a raised state, in which the battery unit 60 is raised above the ground surface as shown in FIG. 4.

By putting the battery unit 60 in the raised state, the tractor can perform work travel while the battery unit 60 is not in contact with the ground. Also, in the raised state, the battery unit 60 is not in contact with the rear section of the body 3, and therefore the battery unit 60 can also serve as a counterweight. Note that even if the battery unit 60 remains in the lowered state, by letting only the large-diameter caster wheels 65 come into contact with the ground without the shoes 64 coming into contact with the ground, work travel can be performed while the battery unit 60 is towed.

As shown in FIG. 4, the ROPS frame 9 includes a support mechanism 52 by which the battery unit 60 is connected to and supported by the body 3 when the battery unit 60 is in the raised state. The support mechanism 52 includes arm members 52*a* attached to the body 3, and a holding section 52*b* that is provided on the top link 15 and is connected to ends of the arm members 52*a* opposite to the sides thereof attached to the ROPS frame 9. There are various methods for connecting the arm members 52*a* and the holding section 52*b*, but one example thereof is a method in which the end of the arm member 52*a* is in a hook shape formed by bending the end into an L shape, and the ends of the arm members 52*a* are inserted through a hole formed in the holding section 52*b*. By connecting the arm members 52*a* and the holding section 52*b* to each other, the battery unit 60 is connected to and supported on the body 3 via the support mechanism 52 and the top link 15.

As shown in FIGS. 1 and 4, when attaching the battery unit 60 to the three-point link mechanism T, the operator connects a harness 53 to the battery body 61 of the battery unit 60. As shown in FIG. 3, the main battery 20 and the battery unit 60 are connected via a switching mechanism 54 such that they can be switched automatically or manually. Note that the battery unit 60 is connected to the switching mechanism 54 via the harness 53. Due to being switched by the switching mechanism 54, the driving motor 26 and the pump motor 40 are connected to the main battery 20 or the battery unit 60. As shown in FIG. 3, the switching mechanism 54 includes a switching operation section 55 for manually switching between power supply from the main battery 20 and power supply from the battery unit 60. The switching operation unit 55 may also be configured, for example, as a seesaw switch, and may be provided in the driving section 5, but there is no limitation to this, and the switching operation unit 55 may be configured as a radio switch or the like, and may be provided at a location other than the driving section 5.

Also, it is preferable that the switching mechanism 54 controls the amount of power supplied to the motor from the main battery 20 and the amount of power supplied to the motor from the battery unit 60 to the same extent. In this case, the travel motor 26 and the pump motor 40 are smoothly driven without being subjected to fluctuations in the amount of power before and after switching.

OTHER EMBODIMENTS

Hereinafter, others embodiment obtained by modifying the above-described embodiment will be illustrated.

(1) In the above-described embodiment, a configuration including one main battery 20 and one battery unit 60 was described as an example, but the present invention is not limited to the above-described embodiment, and a plurality of main batteries 20 and a plurality of battery units 60 may be included.

(2) In the above-described embodiment, a configuration was described, as an example, in which the battery unit 60 includes the battery body 61 and the carrier 62 that holds the battery body 61, and the carrier 62 includes the attachment section 63, the shoes 64, and the large-diameter caster wheels 65, but the present invention is not limited to the above-described embodiment, and it is also possible to use a configuration in which the attachment section 63 is directly included in the battery body 61.

(3) In the above-described embodiment, a configuration in which the support mechanism 52 is included was described as an example, but the present invention is not limited to the above-described embodiment, and it is also possible to use a configuration that does not include the support mechanism 52.

Figure 5:
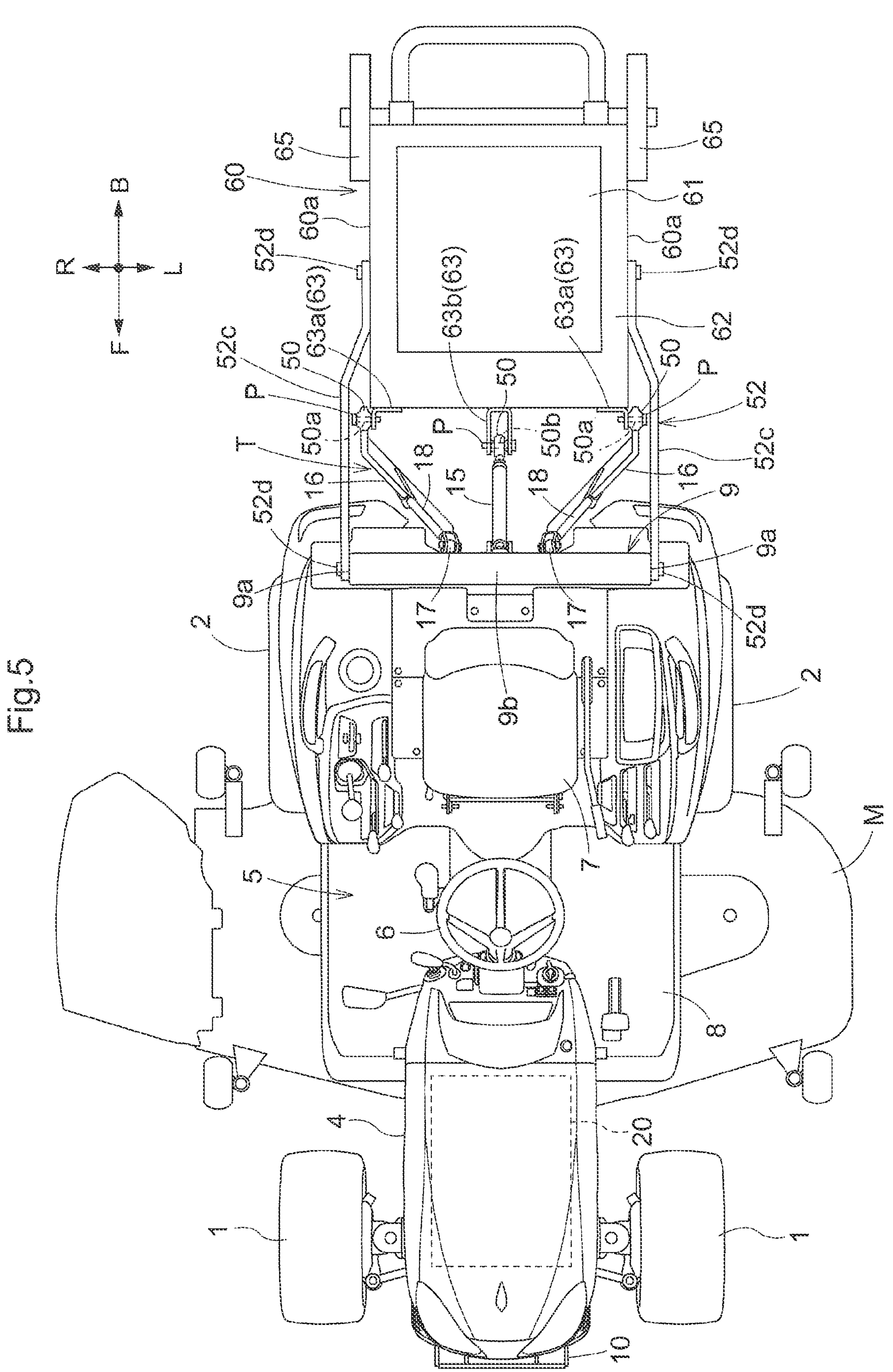
FIG. 5 is a plan view of an electric tractor according to another embodiment.
Figure 6:
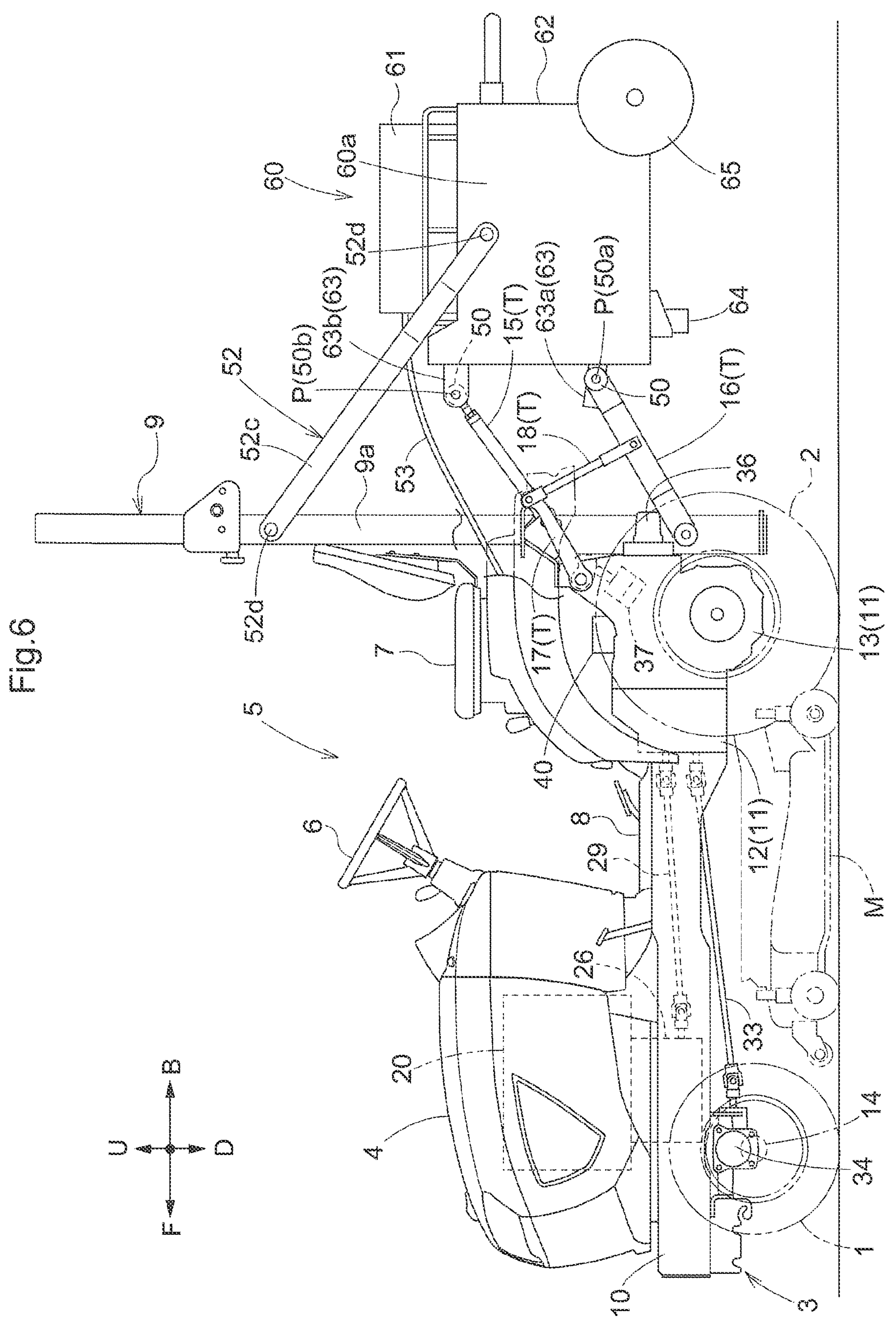
FIG. 6 is a side view of an electric tractor according to another embodiment.

(4) In the above-described embodiment, a configuration was described, as an example, in which the support mechanism 52 is constituted by the arm members 52*a* and the holding section 52*b*, but the present invention is not limited to the above-described embodiment, and for example, as shown in FIGS. 5 and 6, the support mechanism 52 may also be constituted by two connecting frames 52*c* (corresponding to the "connecting members" of the present invention) that connect the left and right vertical frame sections 9*a* and the left and right side walls 60*a* of the battery unit 60, respectively. In this case, there are various methods for connecting the left and right vertical frame sections 9*a* and the connecting frame 52*c*, and for connecting the left and right side walls 60*a* of the battery unit 60 and the connecting frame 52*c*. However, although connection may also be made, for example, using screws 52*d* that pass through holes (not shown) formed in the left and right vertical frame sections 9*a*, the left and right side walls 60*a* of the battery unit 60, and the connecting frames 52*c*, there is no limitation thereto. Also, the support mechanism 52 may include the arm members 52*a*, the holding section 52*b*, and the two connecting frames 52*c*. Note that in FIGS. 5 and 6, the same components as in the above-described embodiment are denoted by the same reference numerals.

(5) In the above-described embodiment, a configuration in which the switching operation section 55 is included was described as an example, but the present invention is not limited to the above-described embodiment, and it is also possible to use a configuration in which the switching operation section 55 is not included. In this case, it is also possible to use a configuration in which, in response to the remaining amount of a battery, out of the main battery 20 and the battery unit 60, that is supplying power becoming less than a certain value, the switching mechanism 54 automatically switches to power supply from the other battery out of the main battery 20 and the battery unit 60.

(6) In the above-described embodiment, a configuration was described, as an example, in which the harness 53 is connected to the battery body 61 of the battery unit 60. However, the present invention is not limited to the above-described embodiment, and it is also possible to use a configuration in which the harness 53 is connected to the carrier 62, and the battery body 61 and the switching mechanism 54 are connected to each other via the carrier 62.

(7) In the above embodiment, a configuration was described, as an example, in which the arm members 52*a* are provided on the top link 15, but the present invention is not limited to the above-described embodiment, and for example, a configuration is also possible in which the arm members 52*a* are provided on the carrier 62 of the battery unit 60.

Note that the configurations disclosed in the above-described embodiment (including the other embodiments; the same applies hereinafter) can be applied in combination with the configurations disclosed in the other embodiments as long as there is no contradiction. Also, the embodiments disclosed in this specification are illustrative, and the embodiments of the present invention are not limited thereto, and can be modified as appropriate without departing from the object of the present invention.

INDUSTRIAL APPLICABILITY

This invention can be used as an electric work vehicle that includes a three-point link mechanism and is driven by a motor supplied with power from a battery.

LIST OF REFERENCE SIGNS

3 Body
20 Main battery (first battery)
40 Pump motor (drive device)
52 Support mechanism
54 Switching mechanism
55 Switching operation section
60 Battery unit (second battery)
T Three-point link mechanism

What is claimed is:

1. An electric work vehicle, comprising:
a body configured to travel;
a first battery accommodated in the body;
a three-point link mechanism connected to a rear section of the body in such a manner as to be swingable up and down;
a drive device configured to drive the three-point link mechanism to swing; and
a second battery detachably attached to the three-point link mechanism,
wherein the second battery is switchable, by swinging of the three-point link mechanism, between a lowered state, in which the second battery is in contact with a ground surface, and a raised state, in which the second battery is raised above the ground surface.

2. The electric work vehicle according to claim 1, further comprising a support mechanism by which the second battery is connected to the body and supported on the body while the second battery is in the raised state.

3. The electric work vehicle according to claim 1, further comprising a switching mechanism configured to automatically or manually switch between power supply from the first battery and power supply from the second battery.

4. The electric work vehicle according to claim 3, wherein the switching mechanism comprises a switching operation section configured to manually switch between power supply from the first battery and power supply from the second battery.

5. The electric work vehicle according to claim 3, wherein in response to a remaining amount of one battery, out of the first battery and the second battery, that is supplying power being less than a certain value, the switching mechanism automatically switches to power supply from another battery out of the first battery and the second battery.

6. The electric work vehicle according to claim 2, further comprising a switching mechanism configured to automatically or manually switch between power supply from the first battery and power supply from the second battery.

* * * * *